United States Patent

[11] 3,603,067

| [72] | Inventor | Lewis L. Wilde |
| | | Bailey, Mich. |
| [21] | Appl. No. | 735,807 |
| [22] | Filed | June 10, 1968 |
| [45] | Patented | Sept. 7, 1971 |
| [73] | Assignee | Wilde Manufacturing, Inc. |
| | | Bailey, Mich. |

[54] CUCUMBER-HARVESTING MACHINE
5 Claims, 13 Drawing Figs.

[52] U.S. Cl. ............................................. 56/327 R
[51] Int. Cl. ............................................. A01d 45/00
[50] Field of Search ............................................. 100/76;
172/19; 171/161; 130/30 A; 56/229, 327, 1

[56] References Cited
UNITED STATES PATENTS

| 3,252,520 | 5/1966 | Hill et al. | 56/229 X |
| 2,282,626 | 5/1942 | Watne | 56/327 |
| 3,070,944 | 1/1963 | Peto et al. | 56/327 |
| 3,078,926 | 2/1963 | Ries et al. | 56/327 X |
| 3,294,094 | 12/1966 | Dreyer | 56/327 X |
| 3,330,363 | 7/1967 | Greedy | 56/327 X |
| 3,347,031 | 10/1967 | De Long et al. | 56/327 |
| 3,387,612 | 6/1968 | Tillotson | 56/327 X |
| 3,420,312 | 1/1969 | Greedy | 56/327 X |

*Primary Examiner*—Louis G. Mancene
*Assistant Examiner*—J. N. Eskovitz
*Attorney*—Glenn B. Morse ABSTRACT: A cucumber-harvesting machine adapted to sever vines from the roots with a knife having variable angle of attack, elevate the vines from the ground with a conveyor, strip cucumbers from the vines with rollers variably spaced horizontally from the discharge end of the elevating conveyor, and transfer the cucumbers to an accumulating station with a conveyor having a transverse section for discharging trash with an upward and lateral movement opposite to the movement of the cucumbers into the station.

INVENTOR.
Lewis L. Wilde
ATTORNEY

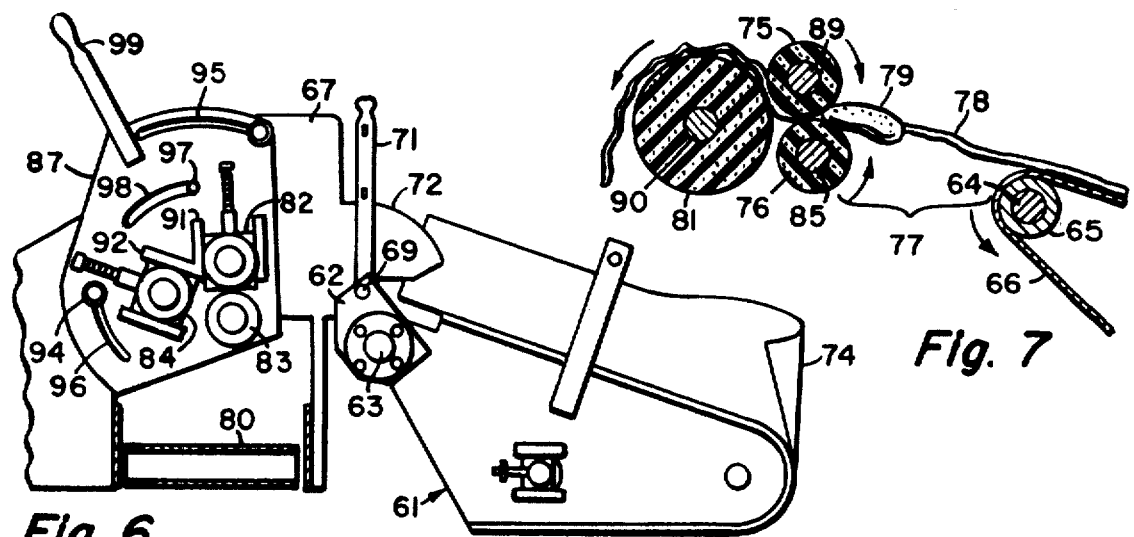
Fig. 6
Fig. 7
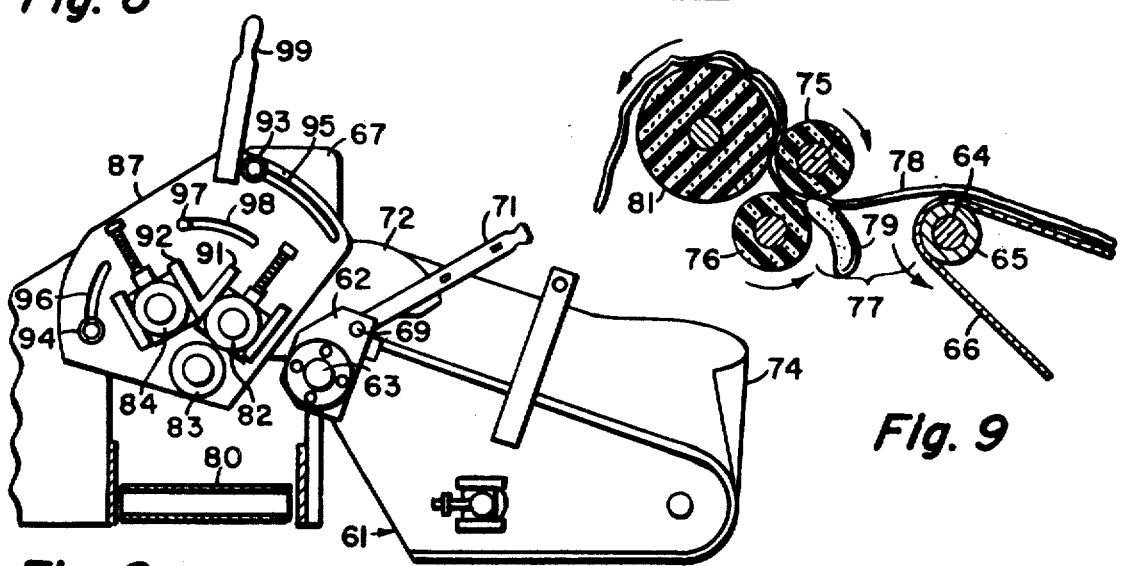
Fig. 8
Fig. 9
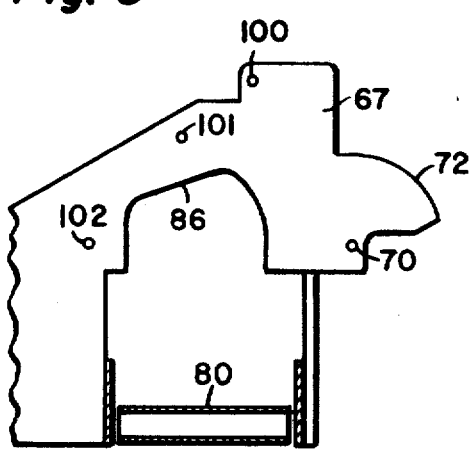
Fig. 10
INVENTOR.
Lewis L. Wilde
BY
ATTORNEY INVENTOR.
Lewis L. Wilde
BY
ATTORNEY

CUCUMBER-HARVESTING MACHINE

BACKGROUND

One of the recognized procedures for harvesting cucumbers is to cut the plants free of the roots, and convey the plants to a picking station where they pass between rollers that pinch off the cucumbers. The movement of the vines from the elevating conveyor over to the picking rollers has been recognized as a rather critical aspect of a machine operating on this principle. Some machines have provided for an upward movement of the vines at this point, utilizing what is referred to as column effect in the vines stems, and supplemented by a high-velocity flow of air to induce the vine movement in a desired direction. The air blast has also been used to urge the vines in other transfer directions.

SUMMARY OF THE INVENTION

The problem centers in the random configuration of the vines and stems, differing in stiffness, weight, and bulk of foliage. This invention utilizes a generally horizontal transfer of the vines across a sufficient gap between the discharge end of the elevating conveyor over to the picking rollers to permit the cucumbers to disengage from the vines and drop down onto the receiving conveyor system that ultimately delivers them to an accumulating bin. Applicant has discovered that a machine can be accommodated to vines of varying characteristics by varying the horizontal distance of the vine-suspension transfer gap between the elevating conveyor and the picking rollers, and by varying the vertical relationship between these components. The preferred structure for varying these relationships centers in (a) a mounting of the discharge end of the vine-elevating conveyor on a depending arm that can swing in a front-rear direction (with respect to the direction of movement of the machine) to bring the point of discharge of the conveyor toward or away from the picking rollers, and (b) a mounting on the picking rollers in bearings carried by rotatable plates secured to the frame of the machine, with the bearings being positioned eccentrically with respect to the axis of rotation of the plates to cause the rollers to move vertically and establish the position of the junction of the rollers at the proper height to receive particular plants as they bridge across the gap between the picking rollers and the vine-elevating conveyor.

In the so-called "once over" harvesting system (in which the entire crop of cucumbers is harvested at one time, rather than with successive pickings) it is conventional procedure to sever the vines from the roots to facilitate their movement through the machine. The release of the vines from the ground is facilitated by disturbing the ground somewhat with the root-severing knife, and this invention provides an arrangement for accommodating the knife to various ground conditions by altering the angle of attack of the knife. It appears that different types of soil will require a different position of the knife with respect to the horizontal in order to get the desired severing and freeing of the vines, and this degree of variability is provided by supporting the knife with generally vertical arms that are pivotally mounted on a depending member of the frame of the machine. This mounting is effected at a central point on the blade-supporting arm, so that the upper end of the arm can be subject to a screw adjustment that can be determined with great accuracy. The blade-supporting arm thus functions as a lever with a central fulcrum.

The movement of the picked cucumbers from a position below the picking rollers to the accumulating bin is provided by a conventional receiving conveyor for a major portion of the total distance of movement. This conventional conveyor, however, is interrupted by a transverse conveyor which functions to remove trash and dirt which may have accompanied the vines, and fallen down onto the receiving conveyor along with the cucumbers. It is preferable that both the receiving conveyor and the transverse conveyor be provided with perforated conveying belts which will permit the dirt to fall through under the normal vibrating conditions of the machine. The standard section of the receiving conveyor, however, operates to bring the received material to a position above the accumulating station, at which point it is discharged onto a transverse conveyor disposed so that it acts as a chute inclined downwardly into the accumulating station, but with the receiving course of this conveyor moving in the opposite direction so that the trash is thrown over the side of the machine. The incline of this conveyor is established at such a degree that the cucumbers will roll downwardly against the conveyor movement.

DESCRIPTION OF THE DRAWINGS

The features of the invention will be analyzed in detail through a discussion of the particular embodiments illustrated in the accompanying drawings. In the drawings:

FIG. 6 is a side elevation on an enlarged scale over FIG. 1, showing the bracket structure for supporting the picking rollers and the discharge end of the vine-elevating conveyor.

FIG. 7 is a section through the central portion of the picking rollers, showing the position of these rollers with respect to the discharge end of the vine-elevating conveyor.

FIG. 8 is a view similar to FIG. 6, showing the mechanism in a displaced position from that of FIG. 6.

FIG. 9 shows the relationship of the picking rollers and the vine-elevation conveyor corresponding to the FIG. 8 position.

FIG 10 is a view of the portion of the frame of the machine supporting the bracket structure illustrated in FIGS. 6 and 8.

DESCRIPTION OF THE PREFERRED EMBODIMENTS

KNIFE-SUPPORTING STRUCTURE

Figure 1:
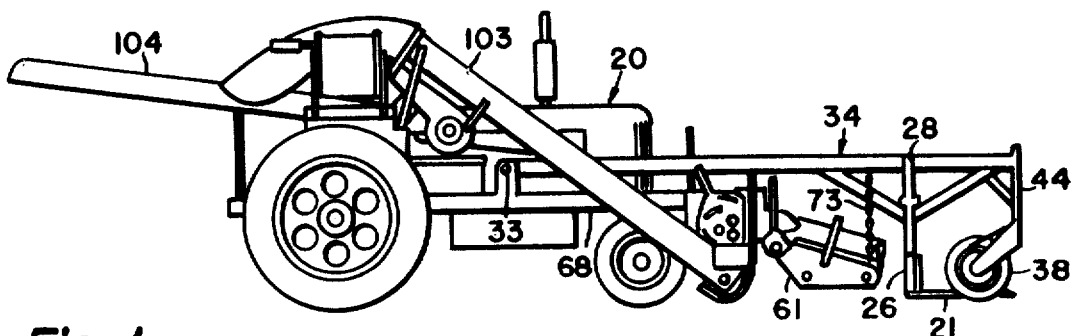
FIG. 1 is a side elevation of a complete cucumber-harvesting machine embodying this invention.
Figures 2, 3:
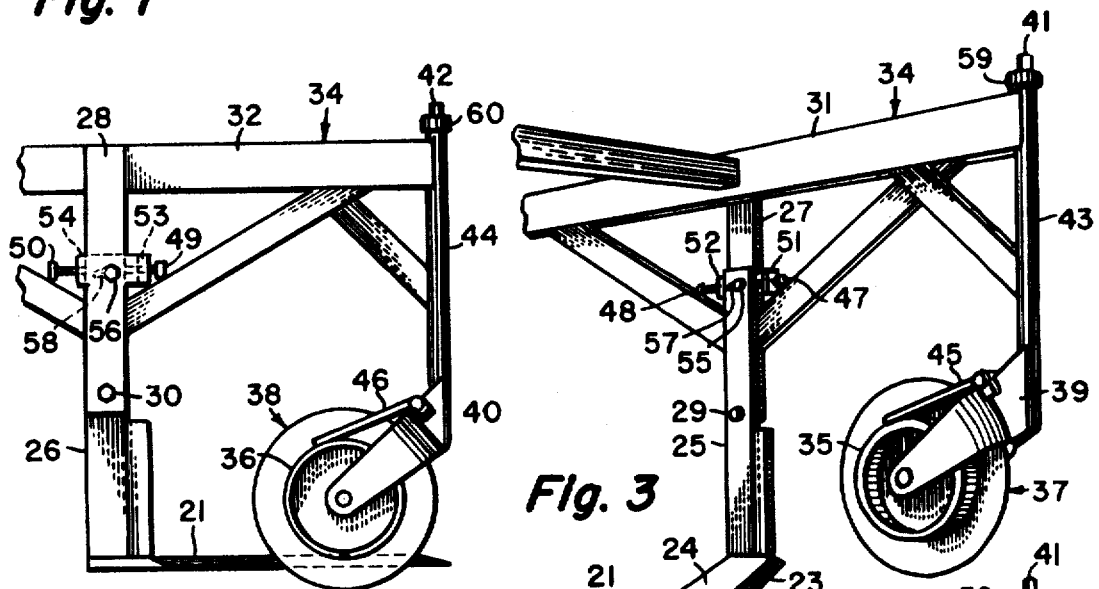
FIG. 2 is a side elevation, on an enlarged scale, of the machine shown in FIG. 1 containing the root-severing knife and its supporting structure.
FIG. 3 is a perspective view of the portion of the machine shown in FIG. 2.
Figures 4, 5:
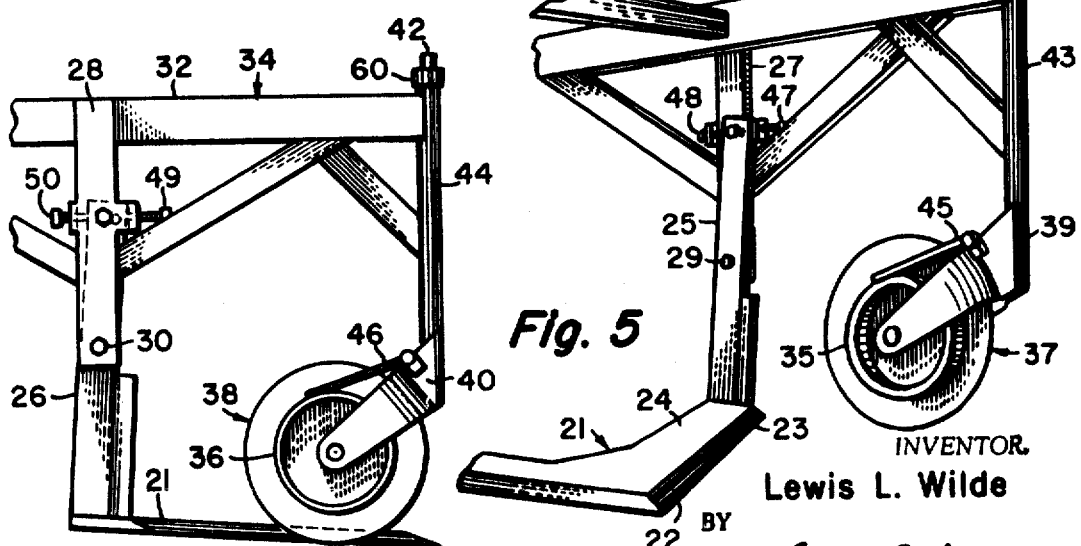
FIG. 4 is a view similar to FIG. 2, with the horizontal knife in a position displaced from the FIG. 2 position.
FIG. 5 is a perspective view of the structure shown in FIG. 4.

The cucumber-harvesting machine illustrated in FIG. 1 is in the form of a group of attachments to a standard farm tractor indicated at 20. For functional purposes, the chassis of a tractor may be considered as part of the "frame" of the harvesting machine. The normal direction of movement of this machine would be from left to right, as shown in FIG. 1, and the first component of the machine to encounter the vines along the row will be the V-shaped horizontal knife 21 which severs the vines from the roots. This knife normally operates a few inches below the surface of the ground, and subjects the ground to a slight disturbance as it passes through. This disturbance has the effect of shaking the vines above the severing point loose from the surrounding earth as it performs the cutting operation. The configuration of the knife is best shown in FIGS. 3 and 5. It is essentially rectangular in cross section, having an action in the ground somewhat reminiscent of an airfoil passing through the air. The cutting action takes place at the edge 22, and the soil then is forced to pass upward over the beveled surface 23 and the flat top 24. The soil is then dropped over the trailing edge of the knife, to complete the soil-disturbing action that results in shaking the vines loose from the soil above the point at which they are severed from the roots. The substantial width of the knife 21 in the front-rear direction makes it critical that the machine be accommodated to various ground conditions. Whether the soil may be wet or dry, sand or clay, or subject to other variables, it has been found that the functioning of the machine can be preserved at a high degree of efficiency by accommodating the plane of the knife 21 to the particular soil conditions. The knife 21 is supported at its opposite ends by the generally vertical arms 25 and 26, which are pivotally mounted on the depending frame members 27 and 28, respectively with the fulcrum bolts 29 and 30. The frame members 27 and 28 depend from the opposite beams 31 and 32 of a portion of the frame structure which is pivotally supported on the tractor chassis as shown at 33 in FIG. 1. This pivotal mounting permits the forward end of the frame generally indicated at 34 to be positioned by the ground level, which is engaged by the cylindrical flanges 35 and 36 of the knife wheels 37 and 38. These wheels are of generally conventional construction, being mounted in the forks 39 and 40 secured to the vertical shafts 41 and 42 rotatably received within the tubes 43 and 44 of the frame 34. This mounting produces a castering action which permits the wheels to follow the steering movement of the vehicle 20. The scrapers 45 and 46 are also conventional, and are provided to remove accumulations of clay and other soil elements that might adhere to the flanges 35 and 36 to a sufficient degree to disturb the height relationships of the frame 34, and consequently alter the positioning of the knife 21.

The attitude of the knife 21 with respect to the horizontal is controlled by the manipulation of the bolts 47, 48 and 49, 50. These bolts are in threaded engagement with the flange portions 51, 52 and 53, 54 that respectively embrace the depending portions 27 and 28 of the frame 34. The position of the knife-supporting arms 25 and 26 above the fulcrum bolts 29 and 30 can be determined by relative tightening and loosening of the bolts 47-50, and can be secured by tightening the locking bolts 56, which traverse slots as shown at 57 and 58 in the arms 25 and 26 to permit a limited degree of articulation. The relatively slight changes in angle of attack permitted by this mounting are sufficient to accommodate the machine to the varying ground conditions, which would otherwise make the operation of the machine less efficient. The net effect of the knife 21 and the knife wheels 37 and 38 is to sever the roots from everything between the knife wheels. These wheels are positioned directly in front of the laterally outermost edges of the horizontal knife 21 so that any roots which might extend laterally from vines disposed in this area on the surface would be severed by the knife wheels. This relative placement of the vertical knife wheels and the horizontal knife is conventional, and the diagonal bracing associated with the frame 34 may also be considered as conventional. Preferably, the assemblies including the knife wheels, the forks, and the shafts 41 and 42 are removable from the tubular frame members 43 and 44 by disengagement of the collars 59 and 60 which are provided to prevent the assemblies from inadvertently slipping out of engagement.

VARIABLE BRACKET STRUCTURE FOR SUPPORTING THE ELEVATING CONVEYOR AND PICKING ROLLER ASSEMBLIES

Referring to FIGS. 6 through 10, the vine-elevating conveyor generally indicated at 61 is pivotally connected at its opposite sides to the brackets 62 coaxially with the bearings 63 which support the shaft 64 of the roller 65 defining the discharge end of the vine-elevating conveyor. This conveyor includes a group of laterally spaced belts 66, of which the upper courses move to the rear to carry the vines from a position in front of the conveyor upwardly to the point shown in FIGS. 7 and 9. The depending brackets 62 are, in turn, pivotally supported on the frame plates 67 mounted on the vehicle chassis 68 by the pivot bolts 69 engaging the holes 70. The position of the brackets 62, and consequently the front-rear position of the discharge end of the conveyor 61, is controlled by the placement of the handle 71. Preferably, an interlock (not shown) is provided between the handle 71 and the arcuate portion 72 of the frame plates 67. FIGS. 6 and 8 show the two extremes of variation of the placement of the handle 71 and the consequent shift in the front-rear position of the discharge end of the vine-elevating conveyor 61. The vertical placement of the front end of the vine-elevating conveyor (to shift it from inactive to operating position) is controlled by the chains 73 shown in FIG. 1. These chains can position the conveyor about the axis of the bearings 63. The shields 74 on the opposite sides of the machine are optional, and are desirable to hold the vines in engagement with the conveyor, and thus permit a steeper incline.

The shifting of movement referred to above has a primary purpose of changing the front-rear distance between the discharge end of the conveyor 61 and the area between the picking rollers 75 and 76. The gap indicated at 77 between these positions represents a distance over which the vines 78 are self-supporting in suspension between the picking rollers and the conveyor 61. The vines are carried between the rollers 75 and 76, which pinch off the cucumbers 79, permitting them to drop downward onto the receiving conveyor 80. In addition to the necessary gap 77 required for permitting the cucumbers to disengage themselves from the foliage of the vines, it is necessary also to place the picking roller 75 and 76 vertically to properly receive the vines 78 on what would be a natural path of movement determined by the vines' bulk and stiffness. FIGS. 7 and 9 show the presence of the cucumbers on the vines, but without a random mass of foliage which inevitably accompanies them. This foliage passes between the rollers 75 and 76 along with the vines 78, with the entire mass being assisted through the picking rollers with the presence of the pulling roller 81 bearing against the picking roller 75. Occasionally, the vines become wound around the rollers; and the roller drive system (not shown) is reversible to clear the machine. In addition to changing the vertical position of the area immediately between the picking rollers 75 and 76, a comparison between FIGS. 7 and 9 will indicate that the attitude of the plane containing the axes of the rollers 75 and 76 is also altered. In the lower position of the rollers, there is a general incline of this plane in such a direction as to facilitate the dropping of the cucumbers 79. This feature becomes desirable when the smaller gaps at 77 are used. It must be kept in mind that at the time the cucumbers 79 are being disengaged, the gap 77 is largely occupied by vines and foliage.

The bracket structure responsible for the rotary and vertical position of the picking rollers 75 and 76 includes the plates 87 mounted on opposite sides of the machine, each carrying bearing blocks 82 and 83 for supporting the shafts 89 and 85 of the picking rollers 75 and 76, respectively, and also the bearing blocks 84 for supporting the shaft 90 of the pulling roller 81. The roller shafts traverse the opening 86 of the plate 67 shown in FIG. 10. The bearing blocks 82 and 84 are preferably adjustable with standard spring-loaded guideway mountings as shown at 91 and 92. The plates 87 are rotatably supported by the bolts 93 and 94 secured to the frame plate 67, and moving within the concentric arcuate slots 95 and 96 in the plates 87. A pin 97 secured to the plate 67, and operating within the slots 98 in the plates 87, may be used as a stop to determine the range of the rotation of the plates 87 with respect to the frame of the machine. This placement may be affected by manipulation of the handle 99, and then maintained by tightening of the bolts 93 and 94. In FIG. 10, the holes 100, 101, and 102 correspond to the bolt 93, the pin 97, and the bolt 94, respectively.

RECEIVING CONVEYOR SYSTEM

Figure 11:
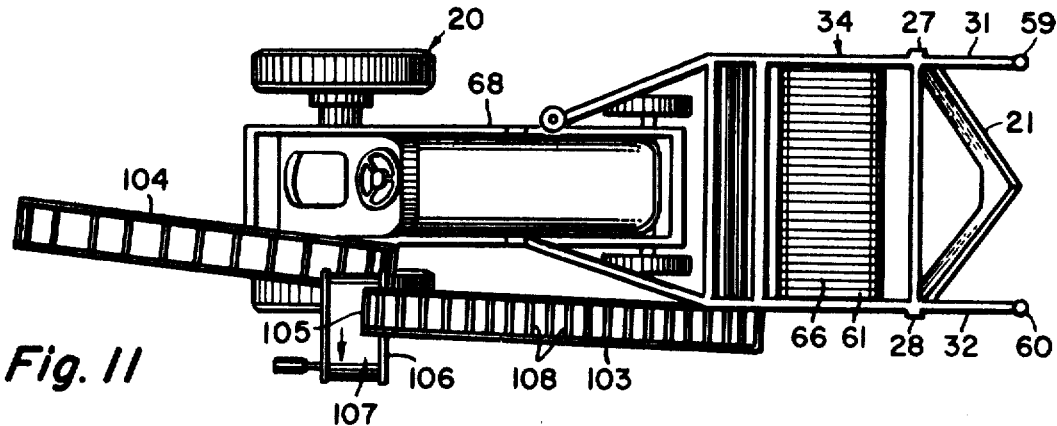
FIG. 11 is a plan view of the machine shown in FIG. 1.
Figure 12:
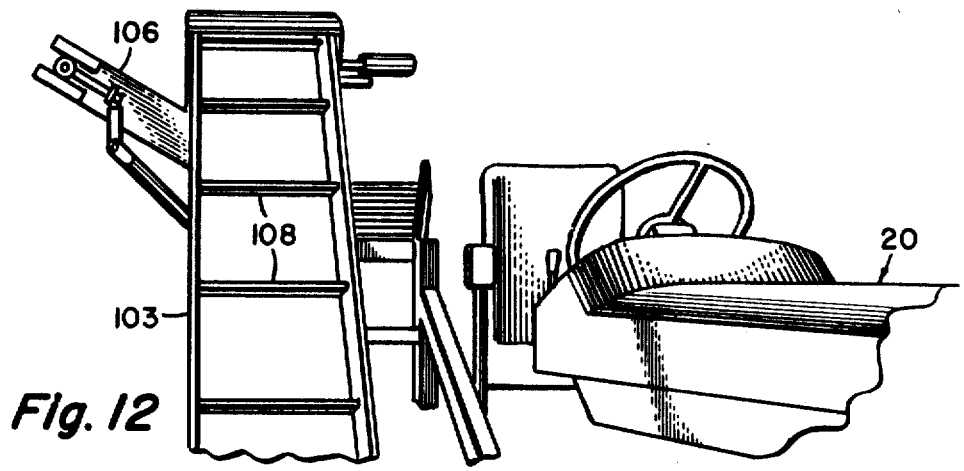
FIG. 12 is a fragmentary perspective view on an enlarged scale, showing the relationship of the transverse trash removal conveyor with respect to the receiving conveyor.
Figure 13:
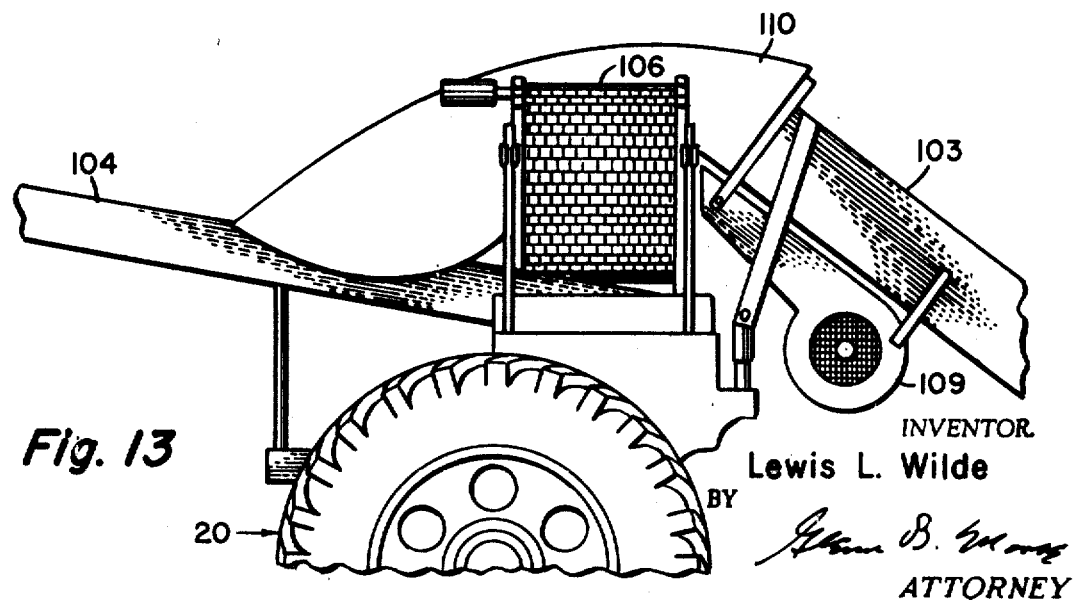
FIG. 13 is a side elevation of the trash removal conveyor, and the immediately surrounding structure.

The first receiving conveyor 80 is disposed immediately underneath the picking rollers, and functions primarily to carry cucumbers laterally so that they can be moved around the machine and into some form of accumulating station normally disposed at the rear. The discharge end of the first receiving conveyor 80 discharges the cucumbers to the receiving end of the second receiving conveyor 103, which is arranged at an incline at the side of the vehicle. The cucumbers are ultimately to be delivered to the bin conveyor 104, which will normally be positioned as shown in FIG. 11 to deliver the cucumbers to a box trailer; or, alternatively, drop the cucumbers directly into some form of bin mounted directly on the vehicle 20. In either case, the conveyor 104 may be considered as the receiving station of the system described here. The receiving conveyor 103 is arranged to elevate the harvested cucumbers to a position considerably above the level of the conveyor 104, and the discharge end 105 of the second receiving conveyor section 103 discharges onto the trash removal conveyor 106. All of these conveyors are essentially endless belt systems; and it is preferable that at least the conveyor sections 80, 103, and the transverse conveyor 106, be perforate so that sand and dirt can fall through under the vibrations of the operating machine. The upper course 107 of the transverse conveyor 106 moves upward and outwardly toward the side of the machine, in the direction of the arrow shown in FIG. 11. While the conveyor section 103 preferably has its belt provided with cleats, as shown at 108, the transverse conveyor 106 does not have these cleats. The angle of inclination of the conveyor 106 is selected to permit the cucumbers to roll downward against the movement of the upper course 107, since this movement will not be obstructed by the presence of cleats. Vine particles and other such trash, however, will be carried upwardly and discharged at the side of the machine, leaving the conveyor 104 free of everything but the harvested cucumbers. If desired, the blower arrangement shown at 109 in FIG. 13 may be used to supplement the effect of the conveyor 106, and blow trash free of the moving cucumbers. The presence of the shield 110 may assist in the separation of the trash from the harvested items. Applicant recognizes that the general principle of transferring mixed trash and harvested items from an elevating conveyor to a secondary conveyor having its receiving course inclined, and provided with such surface conditions as to permit selected items to roll downward against the directional movement of the upper course, is not broadly new. Applicant has discovered, however, that the shifting from front-rear to transverse movement, rather than the previous arrangements involving successive conveyors operating in essentially the same plane, produces very desirable improvements with regard to the directional separation that takes place.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A machine for harvesting cucumbers said machine having a frame, a vine pickup and elevating conveyor, parallel adjacent picking rollers disposed on horizontal vertically spaced axes and spaced horizontally from the discharge end of said vine-elevating conveyor, and a receiving conveyor system adapted to carry picked cucumbers from a position below said rollers to an accumulating station, wherein the improvement comprises:

bracket means supporting said picking rollers and vine-elevating conveyor, said bracket means being mounted on said frame and determining the relative horizontal position of the discharge end of said vine-elevating conveyor with respect to said picking rollers, said bracket means further having freedom of adjustment adapted to alter a gap between said discharge end and the plane containing the axes of said rollers for the accommodation of said machine to vines of varying bulk and rigidity, and including a fulcrum for supporting said discharge end for accommodating the raising or lowering of the opposite end of said vine-elevating conveyor, and also including an arm pivotally mounted at opposite sides of said frame and supporting said fulcrum means, said arms being disposed to generate horizontal movement of said fulcrum means on rotation about the axis of pivotal mounting of said arms.

2. A machine as defined in claim 1, wherein said arms depend from a common axis of pivotal mounting, and said bracket means includes a torsion bar interrelating said arms about the axis thereof, and locking means for securing the adjusted position of said arms.

3. A machine for harvesting cucumbers, said machine having a frame, a vine pickup and elevating conveyor, parallel adjacent picking rollers disposed on horizontal vertically spaced axes and spaced horizontally from the discharge end of said vine-elevating conveyor, and a receiving conveyor system adapted to carry picked cucumbers from a position below said rollers to an accumulating station, wherein the improvement comprises:

bracket means supporting said picking rollers and vine-elevating conveyor, said bracket means being mounted on said frame and determining the relative horizontal position of the discharge end of said vine-elevating conveyor with respect to said picking rollers, said bracket means further having freedom of adjustment adapted to alter a gap between said discharge end and the plane containing the axes of said rollers for the accommodation of said machine to vines of varying bulk and rigidity, and including plates carrying bearing means supporting the opposite ends of said rollers, respectively, said plates being mounted for limited rotation with respect to said frame on an axis spaced from the area of closest approach between said rollers whereby rotation of said plates with respect to said frame alters the relative position of said rollers and said discharge end.

4. A machine as defined in claim 3, wherein said axis of rotation of said plates is so disposed that movement thereof within the said limited rotation generates a predominately vertical displacement of said rollers with respect to said frame.

5. A machine for harvesting cucumbers, said machine having a vine-handling conveyor, picking means for removing cucumbers from vines handled by said vine-handling conveyor, and receiving conveyor means adapted to transfer picked cucumbers from a position adjacent said picking means to an accumulating station, wherein the improvement comprises:

a first receiving conveyor section, disposed beneath said picking means, and adapted to transfer cucumbers laterally to the side of said machine;

a second receiving conveyor section, disposed at the side of said machine and inclined in a vertical plane parallel to the direction of movement of said machine, said second conveyor section being adapted to receive the discharge from said first conveyor section and raise conveyed elements to a height above that of said station; and a transverse conveyor section having the conveying course thereof disposed opposite and underneath the discharge end of said second receiving conveyor section, said course being inclined downward toward said station and moving in the opposite direction away from said station, the inclination of said course being selected to cause conveyed cucumbers to roll down to said station against said course movement, and trash items to be carried at an incline upward and discharged at the side of said machine.